United States Patent
Lee

(10) Patent No.: US 6,801,608 B2
(45) Date of Patent: Oct. 5, 2004

(54) TELEPHONE INCOMING SIGNAL DISCRIMINATOR

(76) Inventor: Hsin Wu Lee, 4FL., No. 21, An Ping Rd., Chung Ho, Taipei Hsien (TW)

( * ) Notice: Subject to any disclaimer, the term of this patent is extended or adjusted under 35 U.S.C. 154(b) by 518 days.

(21) Appl. No.: 09/867,671

(22) Filed: May 31, 2001

(65) Prior Publication Data

US 2002/0181695 A1 Dec. 5, 2002

(51) Int. Cl.[7] .......................... H04M 1/56; H04M 15/06
(52) U.S. Cl. ............................. 379/142.05; 379/142.1; 379/142.11; 379/142.12; 379/142.18; 379/106.08; 379/167.06; 379/207.16; 379/283; 379/373.02
(58) Field of Search ....................... 379/106.07–106.08, 379/142.05, 142.1, 142.11, 142.12, 161, 167.06, 207.16, 214.01, 283, 373.02, 142.18

(56) References Cited

U.S. PATENT DOCUMENTS 5,644,629 A * 7/1997 Chow .................... 379/142.07
5,781,613 A * 7/1998 Knuth et al. ............. 379/88.21
6,044,148 A * 3/2000 Bleile .................... 379/373.02

* cited by examiner

Primary Examiner—Curtis Kuntz
Assistant Examiner—Alexander Jamal
(74) Attorney, Agent, or Firm—Bacon & Thomas, PLLC

(57) ABSTRACT

A telephone incoming signal discriminator includes a first relay, an FSK detector, a DTMF detector, a pin detector, a tone amplifier and oscillation control, an FSK/DTMF decoder IC, a memory, a buzzer, a comparison/setting control IC, an auto answer machine, and a second relay. When a telephone signal is received, it is detected by the FSK detector and the DTMF detector, decoded by the FSK/DTMF detector IC, and then compared with a set code by the comparison/setting control IC, so that the comparison/setting control IC drives the telephone to ring when matched, or switches on the second relay for enabling the incoming telephone signal to be shifted to the auto answer machine when not matched.

1 Claim, 6 Drawing Sheets in# TELEPHONE INCOMING SIGNAL DISCRIMINATOR

BACKGROUND OF THE INVENTION

The present invention relates to a telephone incoming signal discriminator and, more particularly, to such a telephone incoming signal discriminator, which automatically discriminates an incoming telephone signal, letting important telephone calls ring the telephone and leaving unimportant telephone calls to be automatically answered by an automatic answer machine.

In our daily life, we may frequently receive insignificant telephone calls. Receiving insignificant telephone calls is a terrible bore. However, if the telephone is switched off, an important telephone call may be missed. Therefore, it is desirable to provide an improved method to obviate this problem.

SUMMARY OF THE INVENTION

The present invention has been accomplished to solve the above-described problem. It is the main object of the present invention to provide a telephone incoming signal discriminator, which automatically discriminates incoming telephone calls, preventing the user from receiving insignificant telephone calls. It is another object of the present invention to provide a telephone incoming signal discriminator, which automatically gives a signal requesting the calling party to input the code if the telephone number of the calling party is not qualified. The telephone incoming signal discriminator is installed in a telephone and adapted to discriminate incoming telephone signals, comprising a first relay, an FSK detector and a DTMF detector respectively connected to one contact of the first relay and a pin detector, and adapted to detect an FSK signal and a DTMF signal from an incoming telephone signal, a pin detector connected to the telephone line of the telephone and an FSK/DTMF decoder IC, a tone amplifier and oscillation control connected to the telephone line, a FSK/DTMF decoder IC connected to the pin detector and the tone amplifier and oscillation control, a memory, a buzzer, a comparison/setting control IC connected to the memory, the buzzer and the first relay for setting a telephone number and code and storing the set telephone number and code in the memory, an auto answer machine, and a second relay connected to the auto answer machine, wherein when a telephone signal is received, it is detected by the FSK detector and the DTMF detector, decoded by the FSK/DTMF detector IC, and then compared with the set code by the comparison/setting control IC, so that the comparison/setting control IC drives the telephone to ring when matched, or switches on the second relay for enabling the incoming telephone signal to be shifted to the auto answer machine when not matched.

DETAILED DESCRIPTION OF THE PREFERRED EMBODIMENT

Figure 1:
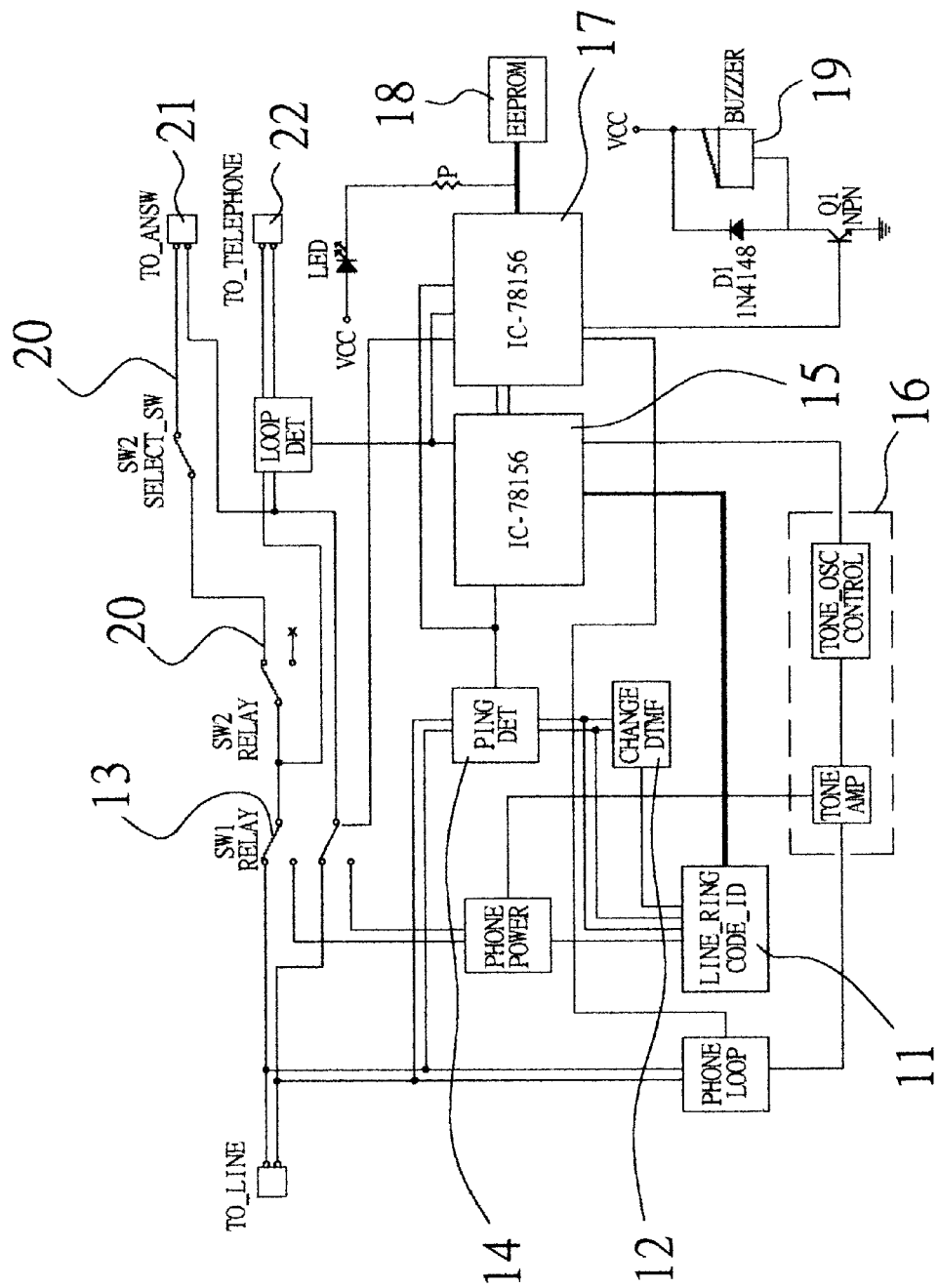
FIG. 1 is a block diagram of telephone incoming signal discriminator according to the present invention.

Referring to FIG. 1, the telephone incoming signal discriminator of the invention comprises a FSK detector 11 and a DTMF detector 12 respectively connected to one contact of a first relay 13 and a pin detector 14, a pin detector 14 connected to the telephone line and a FSK/DTMF decoder IC 15, a tone amplifier and oscillation control 16 connected to the telephone line, a FSK/DTMF decoder IC 15 connected to the pin detector 14 and the tone amplifier and oscillation control 16, a memory 18, a buzzer 19, a comparison/setting control IC 17 connected to the memory 18, the buzzer 19 and the first relay 13, and a second relay 20 connected to an auto answer machine 21.

The first relay 13 has its normal close contact connected to the FSK detector 11 and the DTMF detector 12, and its normal open contact connected to the telephone 22. The comparison/setting control IC 17 is provided for setting telephone numbers and a code and storing the set telephone numbers and code in the memory 18. When a call signal comes, it is detected by the FSK detector 11 and the DTMF detector 12, decoded by the FSK/DTMF detector IC 15, and then the telephone number or code decoded from the call signal is compared with the set telephone number or code by the comparison/setting control IC 17. When matched, the comparison/setting control IC 17 drives the telephone 22 to ring, informing the user to pick up the telephone 22. If not matched, the comparison/setting control IC 17 drives the tone amplifier and oscillation control 16 to output a voice signal, requesting the calling party to input the code. In case the calling party inputs a code upon request of the voice signal from the tone amplifier and oscillation control 16, the code will be detected by the FSK detector 11 and the DTMF detector 12, decoded by the FSK/DTMF detector IC 15, and then compared with the set code by the comparison/setting control IC 17, so that the comparison/setting control IC 17 will drive the buzzer 19 to output an audio calling signal upon recognition of an inputted code from the calling party, leaving the user to decide whether or not to pick up the telephone. By means of the aforesaid arrangement, the user can discriminate important calls from non-important calls.

If the telephone number or code decoded from the call signal, or the inputted code, does not match the set value during the aforesaid call signal or code comparison procedure, the comparison/setting control IC 17 immediately switches off the first relay 13, enabling the auto answer machine 21 to answer the call.

Figure 2:
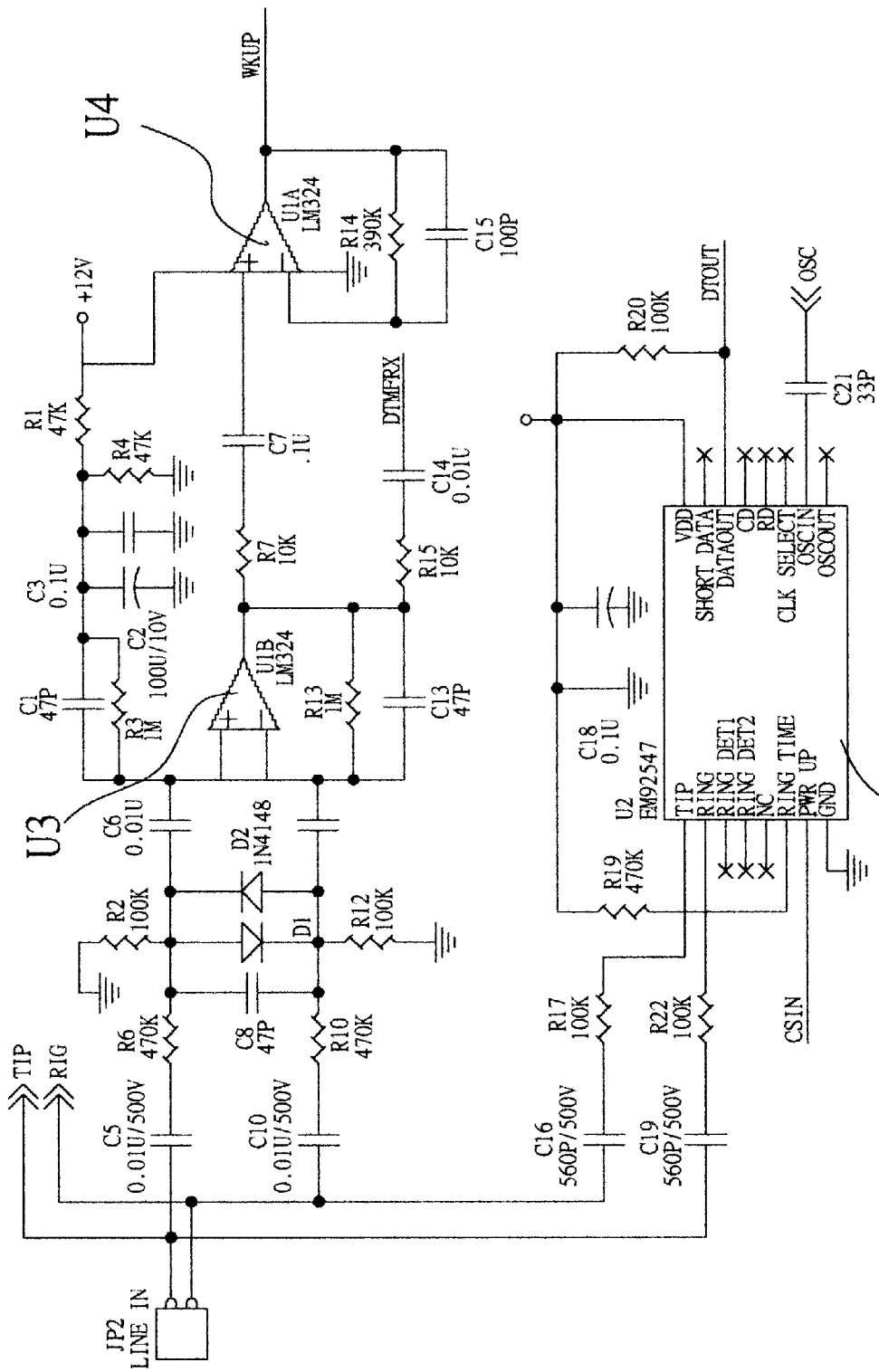
FIG. 2 is a circuit diagram of the FSK detector according to the present invention.
Figure 3:
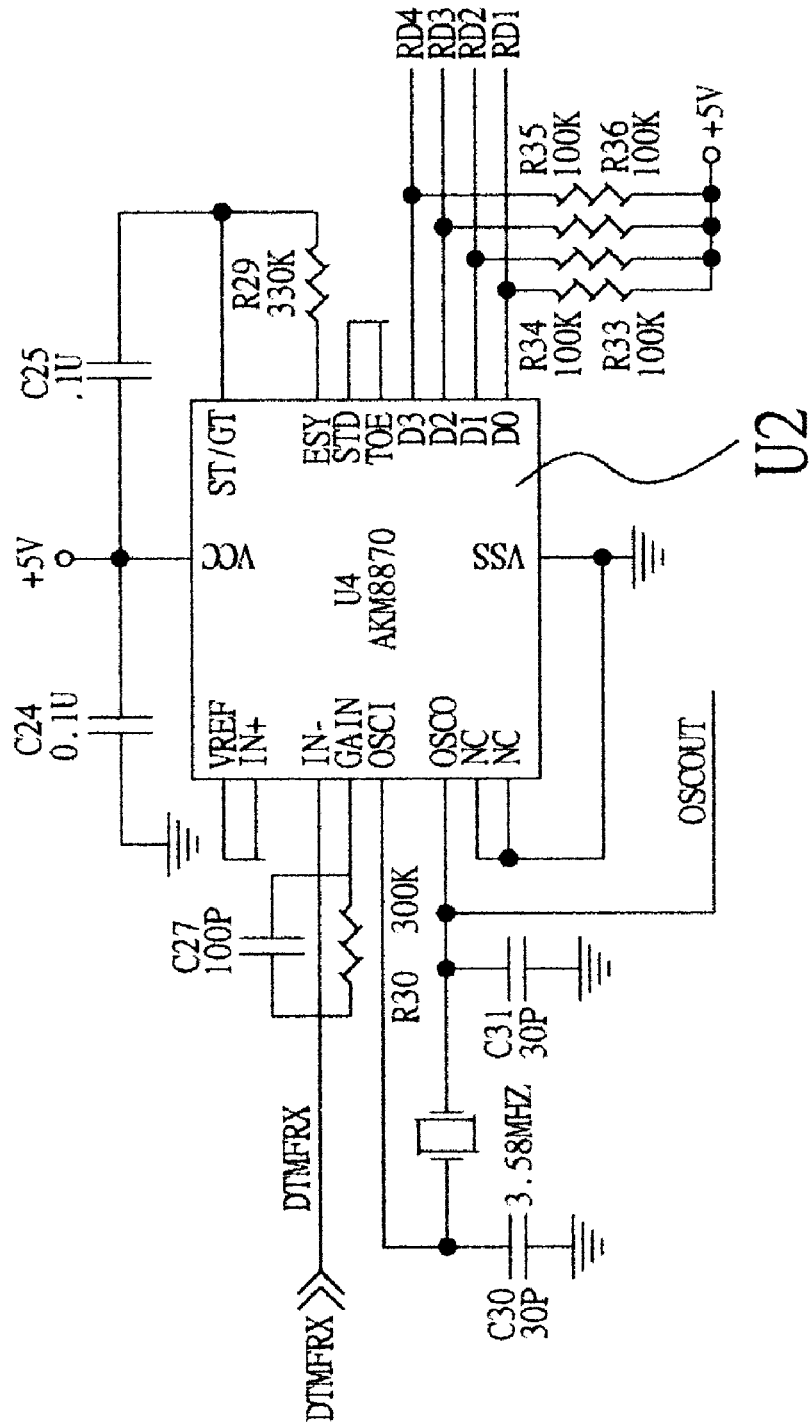
FIG. 3 is a circuit diagram of the DTMF detector according to the present invention.

Referring to FIGS. 2 and 3, the FSK detector 11 and the DTMF detector 12 each comprise a single-chip IC U1 or U2, an amplifier Ur or U4 connected to the single-chip IC U1 or U2, and related resistors and capacitors, and are adapted to detect FSK and DTMF signals on the telephone line for output to the comparison/setting control IC 17.

Figure 4:
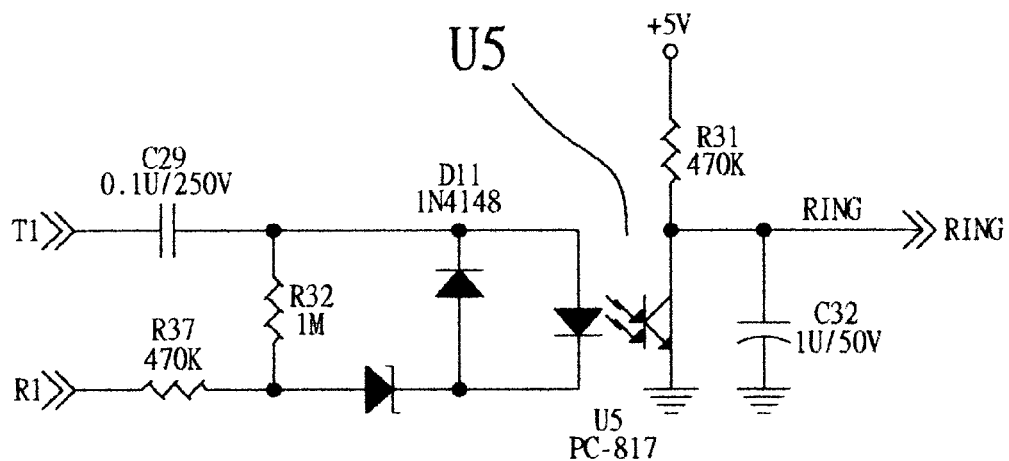
FIG. 4 is a circuit diagram of the pin detector according to the present invention.

Referring to FIG. 4, the pin detector 14 comprises a photo coupler U5 adapted to detect a telephone signal and couple the detected telephone signal to the comparison/setting control IC 17.

Figure 5:
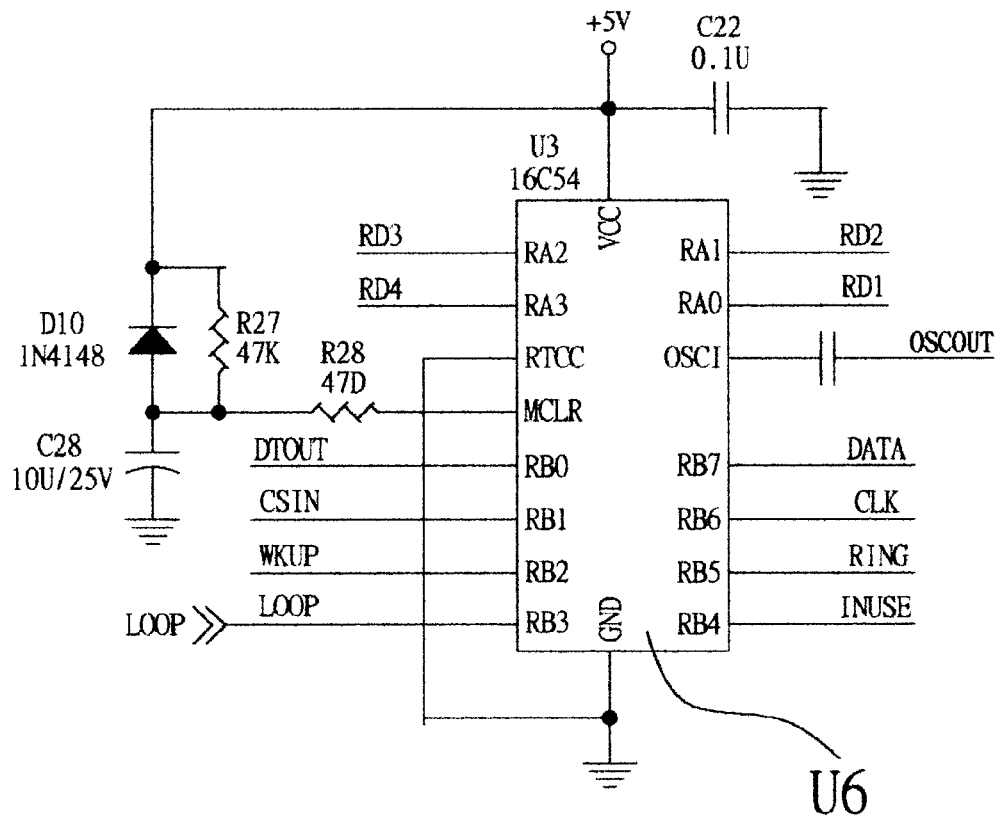
FIG. 5 is a circuit diagram of the FSK/DTMF decoder IC according to the present invention.

Referring to FIG. 5, the FSK/DTMF detector IC 15 is comprised of a single-chip IC U6 adapted to analyze a telephone number and a code from an incoming signal for comparison with the set code by the comparison/setting control IC 17.

Figure 6:
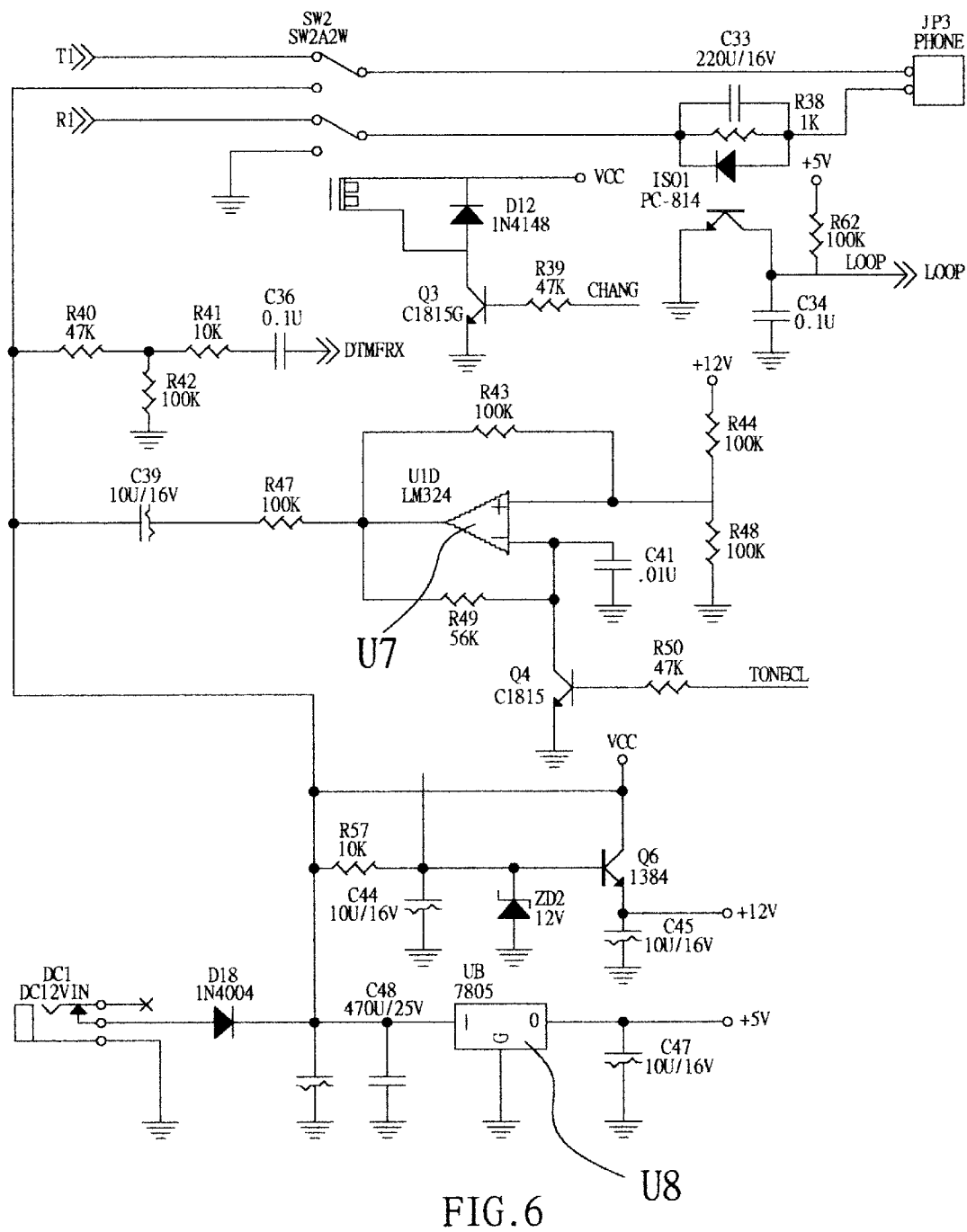
FIG. 6 is a circuit diagram of the tone amplifier and oscillation control according to the present invention.

Referring to FIG. 6, the tone amplifier and oscillation control 16 is comprised of an amplifier U7 adapted to amplify an oscillation signal for connection to the telephone exchange line. The first relay 13 is respectively connected to the telephone 22 and a power supply circuit formed of a voltage stabilizer U8.

Figure 7:
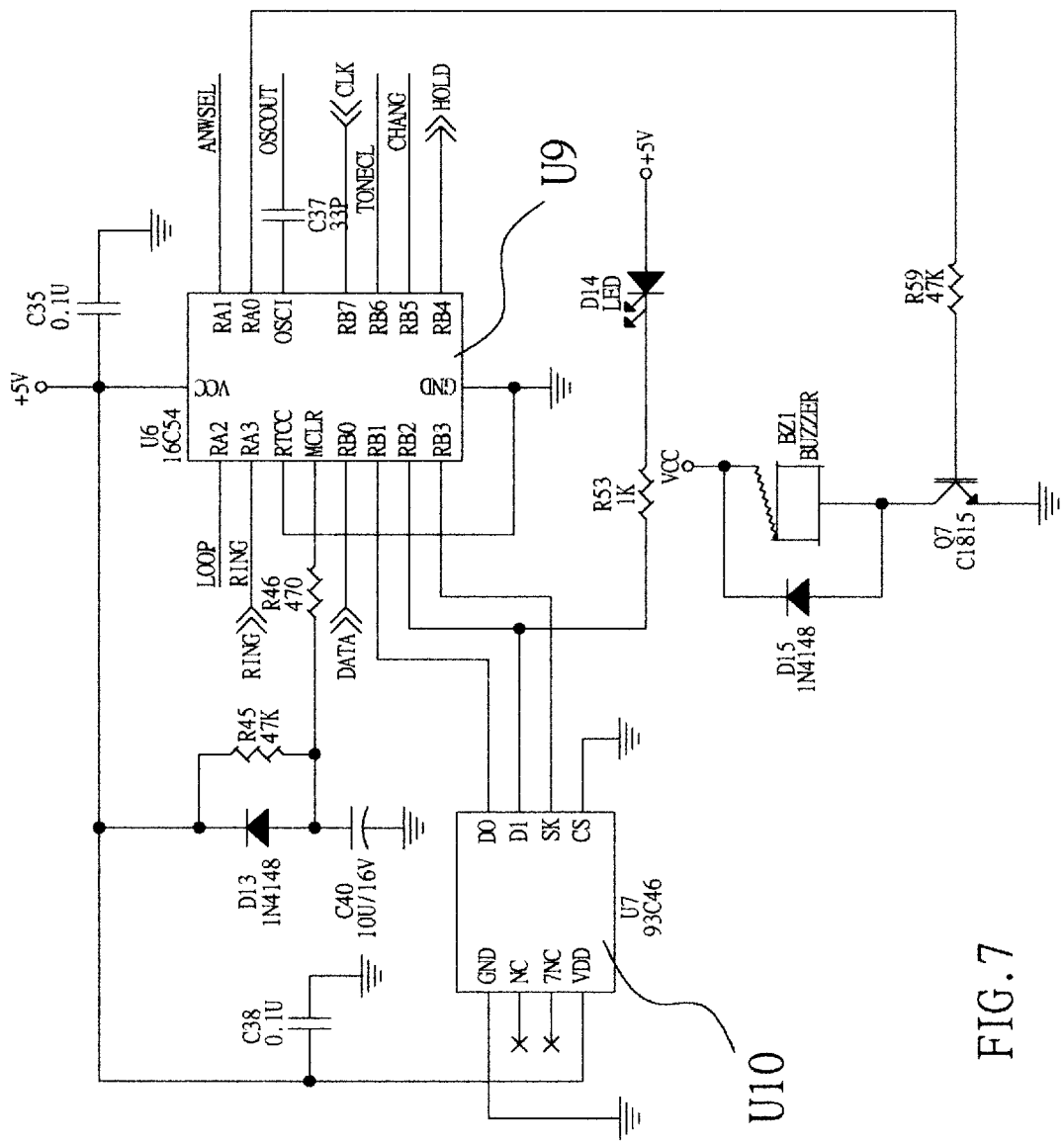
FIG. 7 is a circuit diagram of the comparison/setting control IC according to the present invention.

Referring to FIG. 7, the comparison/setting control IC 17 comprises a single-chip IC U9, and a memory U10 connected to the single-chip IC U9 and adapted to store a pre-set telephone number and code. The output end of the single-chip IC U9 is connected to the buzzer 19.

A prototype of a telephone incoming signal discriminator has been constructed with the features of FIGS. 1~7. The telephone incoming signal discriminator functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A telephone incoming signal discriminator, comprising:

a FSK detection circuit connected to a contact of a first relay and an FSK/DTMF decoding circuit, for detecting an FSK signal from an telephone incoming signal on a telephone line; and a DTMF detection circuit connected to a status detection circuit, wherein the status detection circuit is connected to the FSK/DTMF decoding circuit, for detecting a DTMF signal from the telephone incoming signal, wherein the FSK/DTMF decoding circuit is connected to an oscillator and an amplifier, and further connected to a telephone line and a comparison/setting circuit, and the FSK/DTMF decoding circuit is provided for decoding a telephone number or code from an incoming telephone signal, the decoded telephone number or code being transferred to a comparison/setting circuit upon detection of the telephone number or code;

wherein the comparison/setting circuit is connected to a memory, a buzzer and a second relay and provided for storing a set telephone number or code in said memory, for comparing the set telephone number or code to the telephone number or code decoded from the incoming telephone signal, and for comparing the set code with a code input by a calling party;

wherein a contact of the second relay is connected to an auto-answering machine, and wherein:

when the telephone number or code from an incoming telephone signal matches the set telephone number or code stored in said memory, the first relay is activated and the telephone is caused to ring, when a matching telephone number or code is not detected from the incoming telephone signal, the tone amplifier and oscillation control are driven to output a voice signal requesting the calling party to input the code, if the calling party inputs a matching code, the comparison/setting circuit drives said buzzer to output an audible signal to indicate that a matching code has been input, and if a matching telephone number or code is not detected by the decoding circuit in the telephone incoming signal, and a matching code is not input, the second relay is activated and connects the incoming telephone signal to the auto-answering machine.

* * * * *